United States Patent [19]
Wertheimer

[11] Patent Number: 5,432,331
[45] Date of Patent: Jul. 11, 1995

[54] METHOD AND APPARATUS FOR DETECTING FOCUS OF MOVING IMAGES WITH TILTED PLANE DETECTOR AND TIME DELAY MEANS

[75] Inventor: Alan Wertheimer, Pittsford, N.Y.

[73] Assignee: Eastman Kodak Company, Rochester, N.Y.

[21] Appl. No.: 255,019

[22] Filed: Jun. 7, 1994

[51] Int. Cl.[6] .................................................. G01J 1/28
[52] U.S. Cl. .................................. 250/201.7; 348/349
[58] Field of Search ............ 250/201.7, 201.6, 208.1; 348/349, 350, 356, 345, 354

[56]  References Cited

U.S. PATENT DOCUMENTS

| | | | |
|---|---|---|---|
| 3,945,023 | 3/1976 | Stauffer | 354/408 |
| 4,004,852 | 1/1977 | Pentecost | 356/1 |
| 4,307,947 | 12/1981 | Jyoujiki | 354/406 |
| 4,341,953 | 7/1982 | Sakai et al. | 250/204 |
| 4,458,145 | 7/1984 | Voles | 250/201.7 |
| 4,460,989 | 7/1984 | Russell | 379/94 |
| 4,494,849 | 1/1985 | Namba | 354/406 |
| 4,540,881 | 9/1985 | Hayashi et al. | 250/201.7 |
| 4,621,191 | 11/1986 | Suzuki et al. | 250/201.7 |
| 4,633,075 | 12/1986 | Sakai et al. | 250/208.1 |
| 4,965,442 | 10/1990 | Girod et al. | 250/201.7 |
| 4,992,818 | 2/1991 | Karasaki et al. | 354/407 |
| 5,003,166 | 3/1991 | Girod | 250/201.4 |
| 5,166,506 | 11/1992 | Fiete et al. | 250/201.7 |

*Primary Examiner*—David C. Nelms
*Assistant Examiner*—Jacqueline M. Steady
*Attorney, Agent, or Firm*—Thomas H. Close

[57]  ABSTRACT

A focus detecting system is provided for detecting the focus condition of a moving image in an optical system. The focus detecting system includes means for detecting the sharpness of a plurality of sub-images formed along a plurality of sight lines by the optical system, the detecting means including a plurality of detectors arranged in a plane tilted with respect to an optical axis of said optical system and the detectors aligned with a direction of motion of the image formed by the optical system such that the sub-images are detected at a plurality of positions in the vicinity of best focus of the optical system. A time delay is provided between the sub-images such that the sub images represent the same portion of a scene being imaged by the optical system. A position of best focus for said optical system is calculated from the sub-image data.

12 Claims, 5 Drawing Sheets

METHOD AND APPARATUS FOR DETECTING FOCUS OF MOVING IMAGES WITH TILTED PLANE DETECTOR AND TIME DELAY MEANS

FIELD OF THE INVENTION

The invention relates to a focus detecting system for detecting the location of the plane of best focus of an image forming optical system, and more particularly a focus detecting system designed for use with moving imagery.

BACKGROUND OF THE INVENTION

Prior art methods and devices have been proposed for detecting the in-focus condition of an image forming optical system by evaluating the sharpness of an image formed by said optical system. In one class of systems, as shown in U.S. Pat. No. 4,341,953 issued Jul. 27, 1982 to Sakai et al, photo-sensitive elements having output characteristic which vary in accordance with image sharpness are positioned on opposite sides and at substantially equivalent distances from the plane of best focus. In one arrangement as shown in FIG. 8 herein, an image formed by a lens 10 is split by beam splitters 12 and 12' and focused on a plurality of image sensors 14, 14' and 14". Image sensor 14 is located at the plane of best focus, image sensor 14' is located in front of the plane of best focus and image sensor 14" is located behind the plane of best focus. The signals produced by the image sensors are employed to determine the plane of best focus. The problem associated with using beam splitters is that the amount of light reaching the individual image sensors is reduced, thereby reducing the signal to noise ratio of the focus sensor and making this approach less effective in low light level or short exposure situations. Where the image is moving, the motion of the image compels short exposure times to obviate image smear.

In another arrangement, as shown in FIG. 9 herein, the lens 10 focuses an image onto a plurality of image sensors 14, 14' and 14" located in a plane that is tilted with respect to the optical axis of the lens. This arrangement avoids the light loss associated with beam splitters but has the disadvantage that different image sensors sense different portions of the image. Where the different portions of the image contain different amounts of image detail, the sensor can give a false focus reading, making the sensor fail to perform properly.

SUMMARY OF THE INVENTION

The present invention is directed to overcoming one or more of the problems set forth above. Briefly summarized, according to one aspect of the present invention, a focus detecting system is provided for detecting the focus condition of a moving image in an optical system. The focus detecting system includes means for detecting the sharpness of a plurality of sub-images formed along a plurality of sight lines by the optical system, the detecting means including a plurality of detectors arranged in a plane tilted with respect to an optical axis of said optical system and the detectors aligned with a direction of motion of the image formed by the optical system such that the sub-images are detected at a plurality of positions in the vicinity of best focus of the optical system. A time delay is provided between the sub-images such that the sub images represent the same portion of a scene being imaged by the optical system. A position of best focus for said optical system is calculated from the sub-image data. In a preferred embodiment of the invention, the detector is an area array detector and the sub images are formed by several lines of the image sensor.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
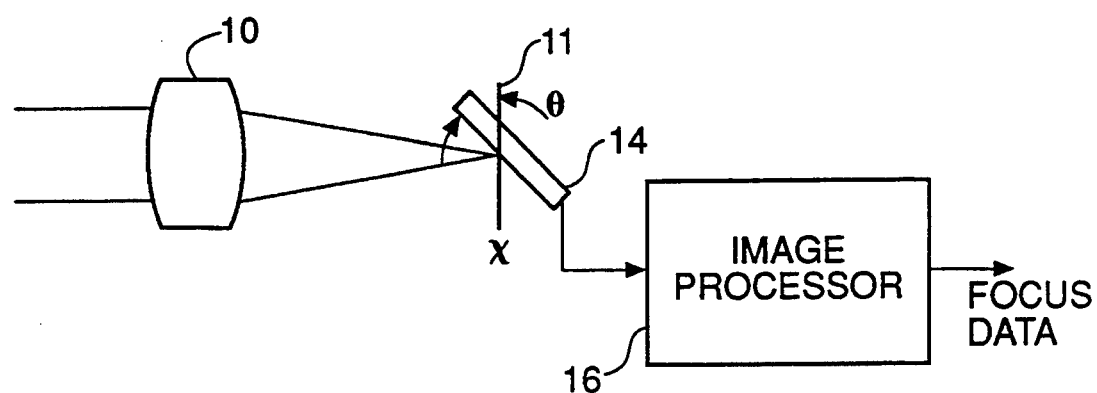
FIG. 1 is a schematic diagram of a focus detecting system according to the present invention.

Turning now to FIG. 1, a focus detecting system according to the present invention is shown. The focus detecting system includes a lens 10, an area array image sensor 14 that is tilted at an angle $\theta$ with respect to the image plane 11 formed by the lens 10. The output of the image sensor is processed by an image processing computer 16 to produce focus data indicating the state of focus of lens 10. The defocus, $\Delta z$ varies with position x on the detector, and the tilt $\theta$ of the detector in the form:

$$\Delta z = x \sin \theta. \tag{1}$$

Figure 2:
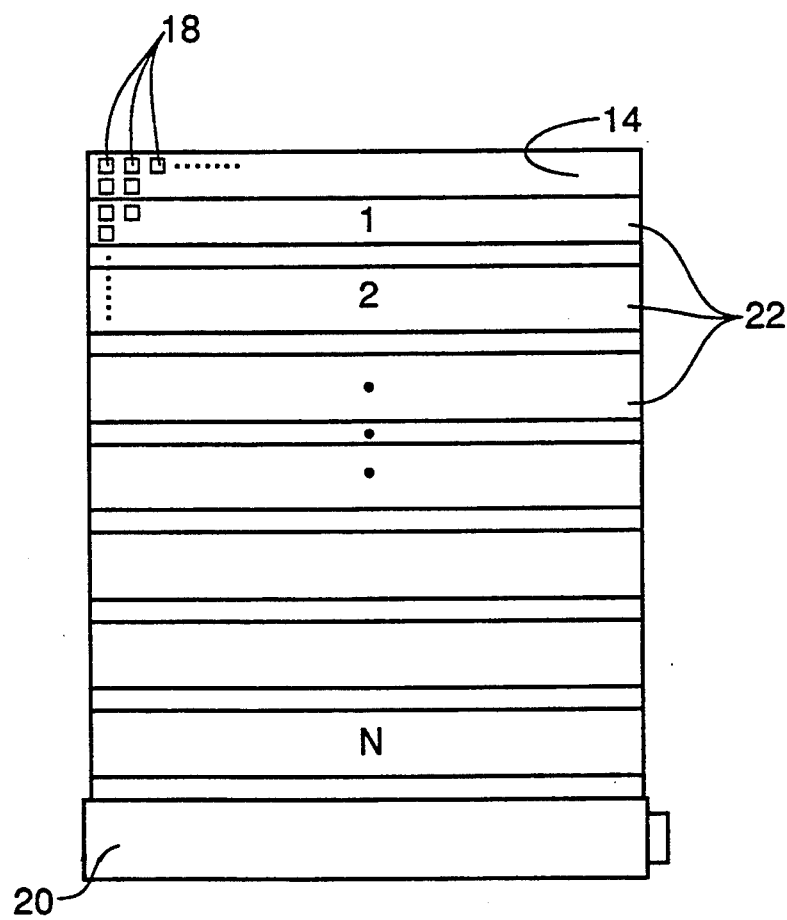
FIG. 2 is a schematic diagram of an area array image sensor used in a preferred embodiment of the present invention.

The tilt angle $\theta$ of the detector depends on the F/No of the optical system as described below. As shown in FIG. 2, the detector 14 may be a CCD area array sensor having rows and columns of image sensing elements 18, and a read out register 20. The image sensor 14 may be any of the well known configurations such as interline or frame transfer. A presently preferred image sensor array is the Pulnix 745E with 768 by 493 image sensing elements. As described in further detail below, the image sensor 14 is employed according to the present invention as if it were comprised of N detector strips 22, each detector strip including J rows of image sensing elements. Where N is typically 16. The rule of thumb for the image sensor 14 shown in FIG. 2 is that the total range of defocus covered by the detector strips is approximately six times the Rayleigh range, R (a common criteria for depth of focus), and defined below:

$$R = \pm 2\lambda (F/No)^2. \tag{2}$$

Using an area detector array provides great flexibility in collecting and processing the scene data. Motion of the image is allowed only in a direction parallel to the columns of the image sensor, but can occur in either direction. The full two dimensional image is collected by the array, however, the processing is restricted to predetermined rectangular strips, as shown in FIG. 2. Each strip consists of several, i.e. 10 to 100 rows of data in the "cross scan" direction separated from the next strip by up to a few hundred pixels in the "in scan" direction (in the direction of image motion). For example, in the Pulnix image sensor array noted above, we selected eight regions comprising 50 rows of 493 sensor elements, separated by 50 rows.

Figure 3:
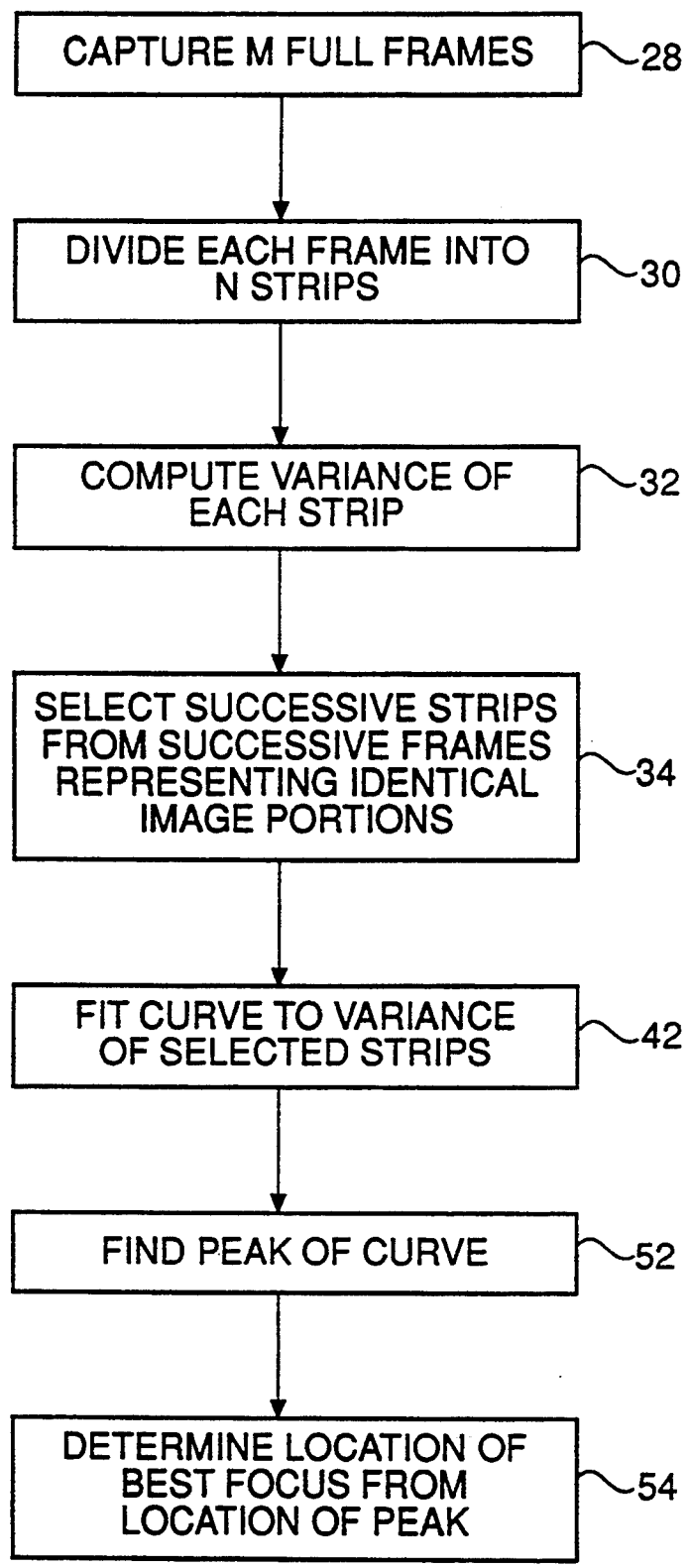
FIG. 3 is a flow chart describing the method of calculating best focus from the data produced by the image sensor of FIG. 2.
Figure 4:
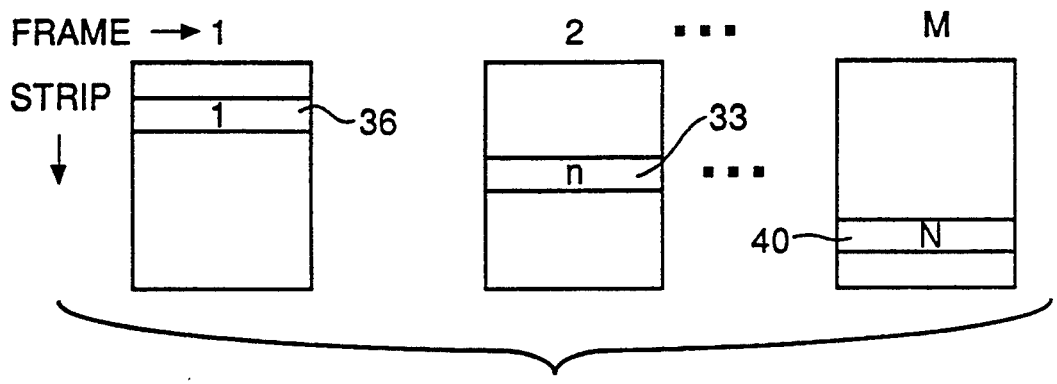
FIG. 4 is a is an illustration useful in describing the operation of the present invention.

Referring now to FIG. 3, the method of determining the position of best focus using the apparatus of the present invention will be described. First, M full frames (typically 8) of image data are captured and stored (28). Next, each frame of image data is divided into N strips (30). FIG. 4 graphically shows the M frames divided into N strips. Next, the variance of the data values in each of the N strips of the M frames is computed (32). The variance (Var) is a measure of the sharpness of the image in the detector strip, the sharpest image having the highest variance, where:

$$Var = \left[ \frac{\frac{\Sigma i^2}{n}}{\left[\frac{\Sigma i}{n}\right]^2} - 1 \right],$$

and i is the intensity of each pixel and n is the number of pixels in the strip. The variance of successive strips from successive frames is selected such that the successive strips represent identical image portions (34). Alternatively, the pixels in the strip may be summed in a column direction and the variance of the sums computed. This approach takes into account the fact that the motion of the image has reduced the sharpness in the column direction and most of the sharpness is in the row direction. Other measures of image sharpness may be used, such as modulation or contrast of an object. By properly selecting data from successive strips from successive frames, the motion of the image across the image sensor will insure that the same portion of the image is represented in each of the data sets. For example, with reference to FIG. 4, the first strip 36 is selected from the first frame, the n'th strip 38 is selected from the second frame, and the N'th strip 40 is selected from the M'th frame. Returning to FIG. 3, a curve is fit (42) through the variance data plotted as a function of strip number (i.e. position on the array).

Figure 5:
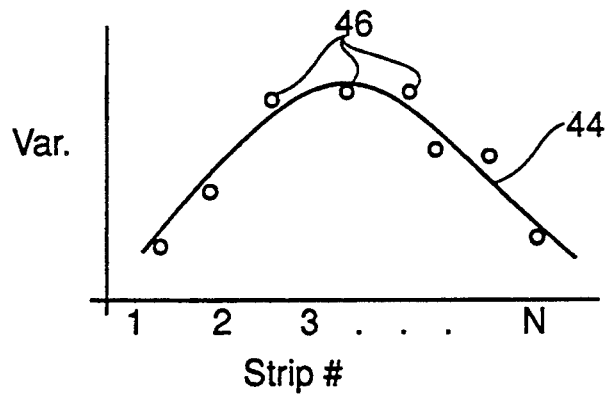
FIG. 5 is a is a plot of variance vs. strip number used to describe the operation of the present invention.

FIG. 5 is a plot of this curve 44 fit through the points 46 representing the variances of the data in the selected strips. Returning to FIG. 3, the peak of the curve 44 is then found (52) using the standard analytic technique for determining where the slope of the curve 44 is equal to zero. The location of the peak of the curve is then used to determine the location of best focus (54) by relating the location on the array indicated by the location of the peak to the Δz value.

To improve the signal to noise ratio and reduce processing time, it is preferable to first compute the average values of the pixels in each column of each strip and then to calculate the variance of the average values.

Figure 6:
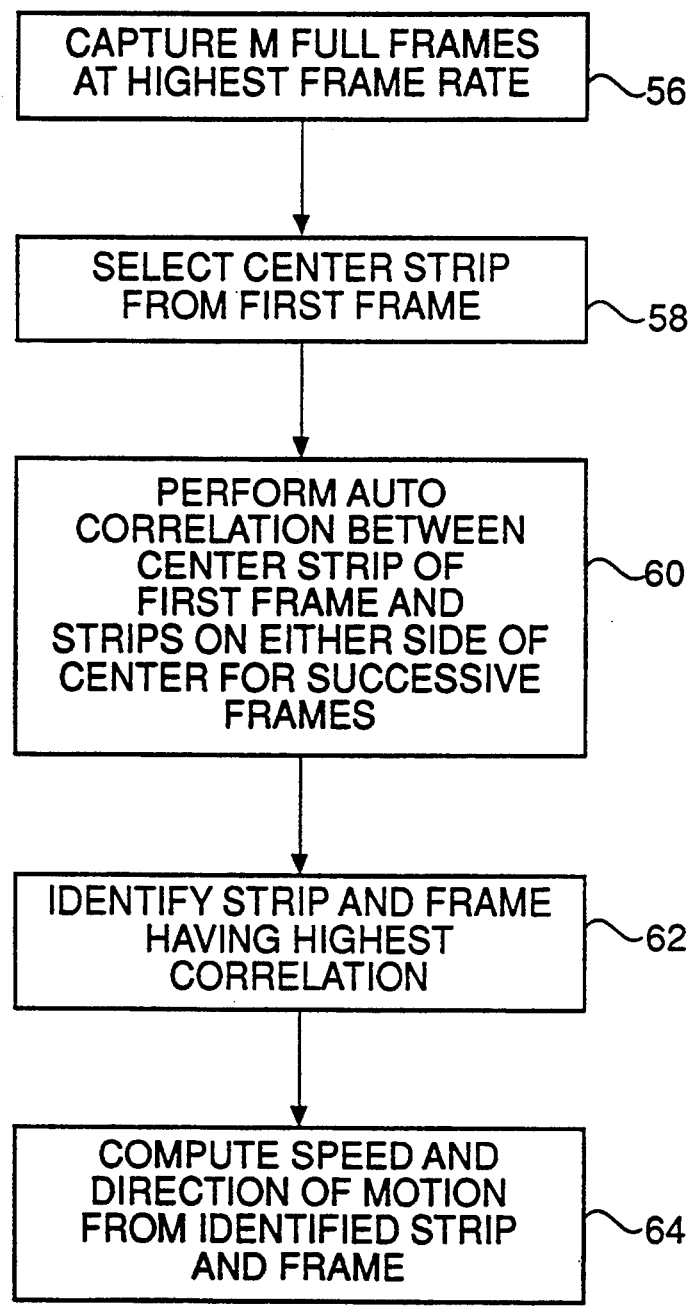
FIG. 6 is a flow chart illustrating an alternative method of practicing the present invention, wherein the velocity of the image is calculated automatically.
Figure 8:
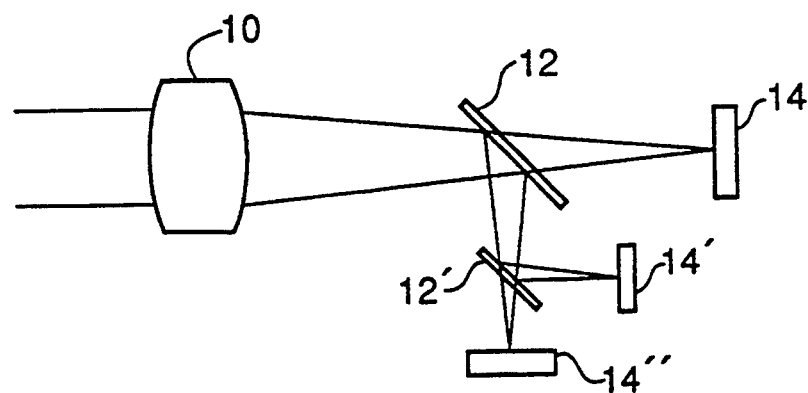
FIG. 8 is a schematic diagram of a prior art focus sensor.
Figure 9:
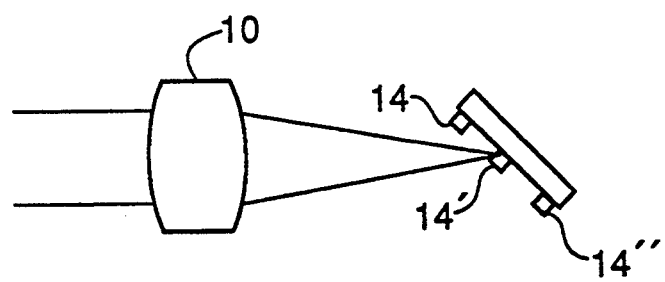
FIG. 9 is a schematic diagram of an alternative prior art focus sensor.

To compare the variances from the same image portion in each of the strips, it is necessary to know the time it takes for the image portion to pass from one strip to the next (i.e. the image velocity). The image velocity can be known before hand, or can be measured by the system by seeking the highest correlation between strips from adjacent frames. A process for automatically determining image velocity (speed and direction) and hence the time delay between successive strips is shown in FIG. 6. First, M full frames are captured at the maximum frame rate of the image sensor (56). Next, the center strip from the first frame is selected (58). Then, an auto correlation is performed between the center strip from the first frame and all strips on either side of the center from each succeeding frame (60). The strip from the succeeding frame having the highest correlation is identified (62) and is an indication of the speed and direction of the image across the sensor (64). Table 1 below lists some representative numbers resulting from this process for the Pulnix 745E sensor array having 11 micron image sensing elements and a 1/1000 frame per second frame rate.

TABLE 1

| Image velocity | 0.5 | 1 | 2 | 5 | 10 | (inches/sec) |
|---|---|---|---|---|---|---|
| Blur for 1/1000 Sec Exposure | 1.1 | 2.2 | 4.5 | 11 | 22 | (pixels) |
| Frames to traverse 300 pixels | 260 | 130 | 65 | 26 | 13 | (Frames) |
| Time to traverse 300 pixels | 0.26 | 0.13 | 0.065 | 0.026 | 0.013 | (Seconds) |
| Time to traverse full detector | 0.67 | 0.33 | 0.17 | 0.067 | 0.033 | (Seconds) |

During use, the image velocity can be expected to remain reasonably stable, so a few tenths of a second would be devoted to measuring the time delay via correlation. Then a variance curve can be constructed using properly timed delay readings. Alternatively, if the measurements occur over several seconds, a composite of readings could overcome the single reading variance difference.

The invention is not limited to a specific number of detector strips. The number of detector strips may be changed during the focus detecting operation in response to changing conditions such as velocity of the vehicle. Since no beam splitters are employed, there is no additional light loss when increasing the number of detector strips. This approach has the potential for improving the accuracy of the measurement method. Any of the well known methods of curve fitting may be employed such as cubic spline, polynomial, etc.

The tilt of the sensor array should be enough to make the defocus associated with the Rayleigh range occur about ¼ of the way to the edge from the center of the sensor array 14, or ⅛ of the total length of the sensor array. The range over which the detector strips are distributed would span the ±⅜ point of the detector array, which would leave some room for registration error. Thus for an array of length S, $$R = S/8. \tag{3}$$

Finally, the nominal tilt of the detector can be determined by equating the $\Delta z$ value at the $\frac{1}{3}$ point with the Rayleigh range for a given F/No, or, $$\theta = \arcsin [16\lambda \ F/No^2/S]. \qquad (4)$$

A list of angles and F/No's for a typical sensor array (Pulnix 745E) with an 8.4 mm side, and for $\lambda = 0.55$ micrometers is shown in Table 2. Other detector sizes will give other tilt angles.

TABLE 2

| F/No. | F/22 | F/16 | F/11 | F/8 | F/5.6 | F/4.0 | F/2.8 |
| --- | --- | --- | --- | --- | --- | --- | --- |
| Tilt $\theta$ (degrees) | 30.5 | 15.6 | 7.28 | 3.84 | 1.88 | 0.96 | 0.47 |

The array can be tilted at a steeper angle than indicated in Table 1 to increase the range over which the sensor can accommodate focus shifts, or shallower angle if greater precision is required over a narrow focus range.

The approach of the present invention allows for real-time algorithm changes. For example, once the nominal focal position is established, the location of two of the detector strips on the image sensor array can be redefined to exactly bracket the best focus position. A much faster algorithm may then be employed to keep the variance of these strips equal to maintain best focus, a opposed to the curve fitting algorithm described above.

Figure 7:
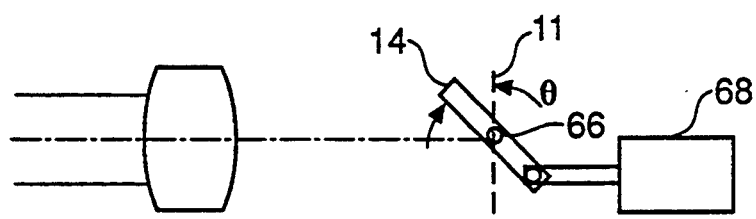
FIG. 7 is a schematic diagram useful in describing the tilt of the image sensor.

If the F/No. of the optical system changes, or it is desired to cover a greater dynamic range of focus positions, a the image sensor array 14 may be mounted on a pivot 66 as shown in FIG. 7 and dynamically tilted by a servo 68.

The invention has been described with reference to a preferred embodiment. However, it will be appreciated that variations and modifications can be effected by a person of ordinary skill in the art without departing from the scope of the invention.

PARTS LIST

10 lens
12 beam splitter
14 image sensor
16 image processing computer
18 image sensing elements
20 readout register
22 detector strips
(28) capture and store frame step
(30) divide image step
(32) compute variance step
(34) select strip step
36 first detector strip from first frame
38 n'th detector strip from second frame
40 N'th detector strip from M'th frame
(42) curve fit step
44 curve
46 data points
(52) find peak of curve step
(54) determine focus step
(56) capture frames step
(58) select center strip step
(60) perform correlation step
(62) pick highest correlation step
(64) compute speed and direction step
66 pivot
68 servo

I claim:

1. A focus detecting system for detecting the focus condition of a constantly moving image in an optical system, comprising:
   a) means for detecting the sharpness of a plurality of sub-images formed along a plurality of sight lines by said optical system said detecting means including a plurality of detectors arranged in a plane tilted with respect to an image plane of said optical system and said detectors aligned with a direction of motion of the image formed by said optical system such that said sub-images are detected at a plurality of positions in the vicinity of best focus of the optical system;
   b) means for providing a time delay between said sub-images such that the sub images represent the same portion of a scene being imaged by said optical system; and
   c) means responsive to said sub-images for computing a position of best focus for said optical system.

2. The focus detecting system claimed in claim 1, wherein said detecting means is an area array image sensor having lines and columns of pixels.

3. The focus detecting system claimed in claim 1, wherein said best focus computing means comprises:
   a) means for determining the sharpness of each sub-image, and
   b) means for finding the location of the peak of sharpness as a function of position, said peak representing best focus of the optical system.

4. The focus detecting system claimed in claim 2, wherein said sub-images include a plurality of lines of pixels of said area array image sensor.

5. The focus detecting system claimed in claim 4, wherein said computing means includes means for summing the pixels in said sub-images in a column direction, means for calculating the variance of pixel sums in a sub image, and means for calculating the position of a maximum variance representing the position of best focus.

6. The focus detecting system claimed in claim 2, further comprising means responsive to the output of said area array for calculating the velocity and direction of motion of said image.

7. The focus detecting system claimed in claim 1, wherein said plurality is greater than three.

8. The focus detecting system claimed in claim 1, further comprising: means for changing the tilt of said detecting means.

9. A method for detecting the focus condition of a constantly moving image in an optical system, comprising the steps of:
   a) detecting the sharpness of a plurality of sub-images formed along a plurality of sight lines by said optical system with a plurality of detectors arranged in a plane tilted with respect to an image plane of said optical system and said detectors being aligned with a direction of motion of the image formed by said optical system such that said sub-images are detected at a plurality of positions in the vicinity of best focus of the optical system;
   b) providing a time delay between said sub-images such that the sub images represent the same portion of a scene being imaged by said optical system; and
   c) computing a position of best focus for said optical system based on the variance of said sub-images.

10. The focus detecting method claimed in claim 9, wherein said computing step comprises:
    a) determining the sharpness of each sub-image, and b) finding the location of the peak of sharpness as a function of position, said peak representing best focus of the optical system.

11. The focus detecting method claimed in claim 10, wherein said computing step includes summing the pixels in said sub-images in a column direction, calculating the variance of pixel sums in a sub image, and calculating the position of a maximum variance representing the position of best focus.

12. The focus detecting method claimed in claim 9, further comprising the step of calculating the velocity and direction of motion of said image by correlating sub images from successive frames.

* * * * *